Nov. 21, 1967  D. J. JORDAN  3,353,355
TURBOFAN LIGHTWEIGHT THRUST REVERSER
Filed May 31, 1966

INVENTOR
DONALD J. JORDAN
BY Fishman and VanKirk
ATTORNEYS

United States Patent Office 3,353,355
Patented Nov. 21, 1967

3,353,355
TURBOFAN LIGHTWEIGHT THRUST REVERSER
Donald John Jordan, Glastonbury, Conn., assignor to United Aircraft Corporation, East Hartford, Conn., a corporation of Delaware
Filed May 31, 1966, Ser. No. 553,824
7 Claims. (Cl. 60—226)

ABSTRACT OF THE DISCLOSURE

A lightweight thrust reverser for a fan type gas turbine engine wherein a lightweight flexible baffle is the flow reversing element. In its operating position the baffle is disposed in an annular array about the main engine housing downstream of the fan section annular discharge passage, and the baffle is supported by movable support elements which also serve to move the baffle between the operative position and a stored position in a storage chamber in the main engine housing.

BACKGROUND OF THE INVENTION

(1) Field of the invention

This invention relates to a thrust reversing mechanism for a gas turbine engine. More particularly, this invention relates to a thrust reverser for a front fan type turbofan engine in which the fan discharges air along the main engine nacelle from an annular discharge passage forward of the aft end of the engine.

(2) Description of the prior art

In the ordinary type of gas turbine or turbojet engine it is possible to reverse the engine thrust by merely reversing the direction of flow of the turbine exhaust gases which are normally discharged rearwardly to the atmosphere to generate thrust. Reference may be had to U.S. Patents Nos. 2,780,057, 2,803,944, 2,838,909, 2,841,956, 2,874,538, and 3,019,600 for suitable thrust reversers for the ordinary type of turbojet engine. However, thrust reversal in a front fan type turbofan engine cannot be efficiently accomplished with similar type structure in view of the large volume of air passing through the fan discharge.

A large volume of relatively cool and relatively low velocity air compared to that which is expelled from the main engine is discharged from the fan to atmosphere for thrust generation purposes. The volume of air discharged to atmosphere from the fan section may be five times as great as the volume of air passing through the main engine, and this fan discharge may be responsible for a large portion of total engine thrust. Hence, unless effective steps are taken, the fan discharge will continue to generate forward thrust when the main engine turbine exhaust gases are being reversed.

As the volume of fan air becomes greater, the problems associated with fan air reversal become correspondingly more difficult. Since the fan structure is located around the main engine nacelle, the fan reversing structure must be of relatively large size, and its size must increase as the volume of air it must handle increases. To use metal elements for reversing the fan air would require a reverser structure of large weight, with the obvious disadvantages of the added engine weight.

Summary of the invention

The present invention employs a foldable fabric type baffle for reversing fan air. The baffle is mounted on the main engine housing downstream of the discharge from the fan section, the baffle being in the form of an annulus around the main engine housing. Since the annular baffle is of a fabric type material, the reverser baffle can be made large to accommodate a large volume of fan air without incurring serious weight penalties. Also, the fabric baffle is flexible so that the reverser structure can be designed to be stable in the reversing position to reduce the aerodynamic and actuation loads and thus contribute to a lightweight design.

Accordingly, one object of this invention is to produce a novel thrust reverser for a turbofan engine in which the fan air is reversed by structure positioned around the main engine housing downstream of the discharge from the fan section.

Another object of the present invention is to produce a novel thrust reverser for a turbofan engine wherein the fan air is reversed by a flexible baffle positioned around the main engine housing downstream of the discharge end of the fan.

Still another object of the present invention is to produce a novel thrust reverser for a turbofan engine wherein a very large volume of fan air is reversed by relatively lightweight structure positioned around the main engine housing downstream of the discharge end of the fan.

Still another object of the present invention is to produce a novel thrust reverser for a turbofan engine wherein the reversing structure is movable between a stowed position and an operative position around the main engine housing, and wherein an intermediate position of the reverser structure constitutes the reverser structure as an airflow spoiler structure.

Other objects and advantages will be apparent from the accompanying drawings and description.

Description of the preferred embodiment

Figure 1:
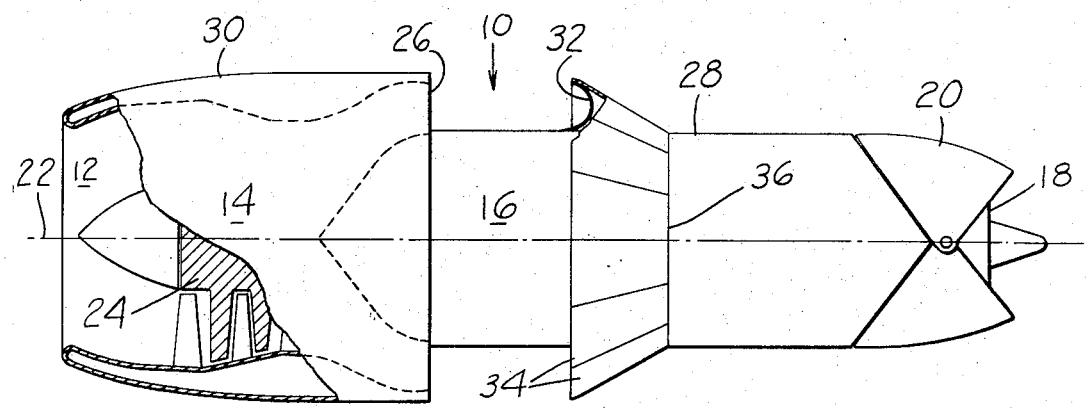
FIGURE 1 is a side elevation view of a turbofan engine showing the fan thrust reverser of the present invention.

Referring now to FIGURE 1, a turbofan engine 10 has an air inlet section 12, a fan or bypass section 14, and a main engine section 16. The well known general structure of main engine section 16 includes a compressor section, a burner section downstream of the compressor section, and a turbine section downstream of the burner section. The discharge end 18 of the main engine section is downstream of the turbine section, and the discharge end of the main engine section supports main engine section reverser structure 20. Engine 10 is of generally circular cross section about axis 22.

With respect to the operation of turbofan engine 10, air enters air inlet section 12, and then passes through compressor 24 in fan section 14. Part of the air passing through compressor 24 passes into an annular discharge chamber 26 formed between a housing 28 for main engine section 16 and a housing 30 for fan section 14, and is then discharged to atmosphere. The remaining part of the air from compressor 24 passes into main engine 16 where it is compressed in its compressor section, heated in its burner section, has energy extracted therefrom in its rbine section to drive both its own compressor section and fan compressor 24, and is thence passed rearwardly through discharge end 18 to atmosphere for the generation of forward thrust. Additional forward thrust is generated from turbofan engine 10 by the air passing directly from compressor 24 through annular disdischarge chamber 26 to atmosphere, the air passing through discharge chamber 26 having been compressed but not heated through the burning of any fuel therein. Fan section 14 and main engine section 16 may be designed to provide any desired proportional relationship between the volume of air discharged through discharge chamber 26 and the volume of air passing through main engine 16.

Gases, including both compressed air from chamber 26 and combustion gases from discharge end 18 are discharged rearwardly (to the right as shown in FIGURE 1) to produce forward thrust for the engine. When thrust reversal is desired, main engine clamshell reverser 20 can be actuated so that it will act in a known manner to deflect the main engine exhaust gases at least partly toward the front of engine 10.

The structure of the present invention for providing thrust reversal for the fan air is shown in the operative position in FIGURE 1. This fan air reverser structure is comprised of a flexible fabric baffle 32 disposed in the form of an annular about main engine housing 28 downstream of the discharge end of annular discharge chamber 26. Since the air to be reversed by baffle 32 is relatively cool and of relatively low velocity, baffle 32 can be made, for example but not by way of limitation, of canvas, metallic reinforced canvas, Fiberglas fabric, or flexible metallic fiber cloth.

As shown in FIGURE 1, baffle 32 extends between main engine housing 28 and a plurality of articulated support plates 34 which are pivotably connected to main engine housing 28 along pivot focus 36. As can be seen in FIGURE 5, a recess 38 in main engine housing 28 constitutes a storage compartment for flexible fabric baffle 32, the storage compartment extending completely around main engine housing 28. Fabric baffle 32 is fastened at one end to support plates 34, and the other end of fabric baffle 32 is fastened around main engine housing 28 within recess 38. An actuating cylinder 40 drives a rack 42 which meshes with a gear 43 mounted on plate 34 to drive support plate 34 between a stowed position and the position shown in FIGURE 3 to extend flexible fabric baffle 32 in the operative position. There are a plurality of actuating cylinders 40, racks 42 and gears 43 disposed about the periphery of the engine, preferably one of each associated with each of the support plate 34. A plurality of springs 44 assist in proper folding of baffle 32 during storage, the springs, one of which is shown in FIGURES 3, 4 and 5, extending from flexible baffle 32 to mounts on plates 34.

Flexible fabric baffle 32 is shown in FIGURE 5 in the operative position wherein it is extended from main engine housing 28 so that it is disposed in the path of the gas exiting from annular discharge chamber 26 whereby the gas is intercepted and the direction of flow is changed as indicated by the arrows. The air exiting from fan discharge chamber 26 has been compressed, but not heated, and it is therefore relatively cool. This fan discharge air also has a relatively low velocity. Thus, the fan discharge air can be intercepted and reversed by reverser structure having a fabric baffle as the operative reversing element without danger of burning the fabric or damaging the fabric such as by ripping or tearing from impact loading. Flexible baffle 32 is designed to have or assume a stable position when extended and under load as shown in FIGURE 5, and this stable position thus reduces the aerodynamic and actuation loads on plates 34 and the actuating mechanism to achieve an overall lightweight design, a feature of extreme importance in aircraft installations.

Figure 3:
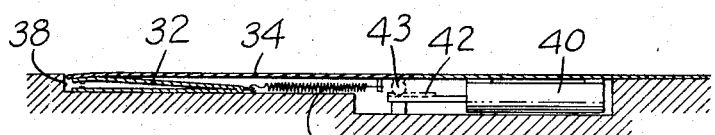
FIGURE 3 is an enlarged fragmentary view of the reverser structure of FIGURE 1 in the stowed position.

Referring now to FIGURE 3, the reverser structure of the present invention is shown in the stowed position. As can be seen, baffle 32 assumes a position in which it is folded on itself when stowed. The fan reverser structure is moved from the operative position of FIGURE 5 to the stowed position of FIGURE 3 by delivering an appropriate signal to actuating cylinders 40 to cause racks 42 to move support plates 34 counterclockwise about their pivot connections with the main engine housing. An opposite signal will, of course, extend the reverser. The natural curvature of baffle 32 toward the interior of recess 38 produces a natural inclination for baffle 32 to fold upon itself as the reverser structure is moved toward the stowed position. Springs 44 may also be employed to pull the central portion of baffle 32 toward the interior of recess 38 as a further means of insuring that the baffle will fold upon itself to provide proper storage. As can be seen in FIGURE 3, support plates 34 act as cover plates extending across and closing recess 38 when the reverser structure is in a stowed position.

Figure 4:
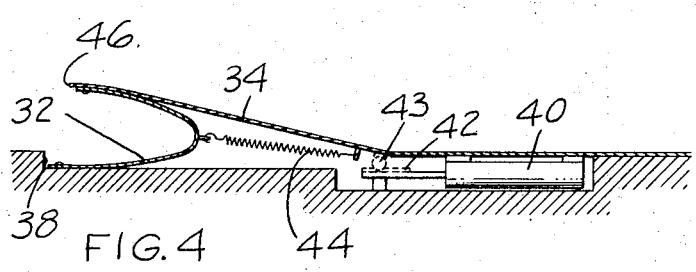
FIGURE 4 is an enlarged fragmentary view of the reverser structure of FIGURE 1 in an intermediate position between the stowed position and the operable reverser position.
Figure 5:
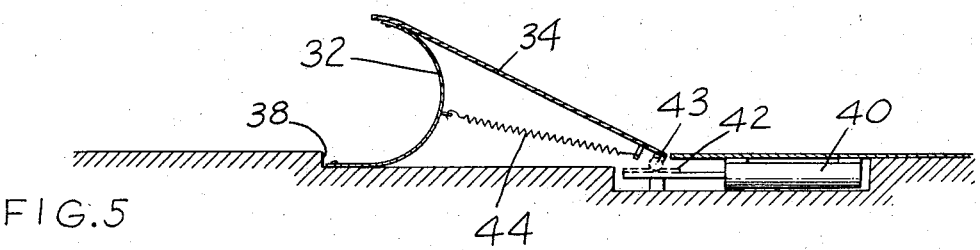
FIGURE 5 is an enlarged fragmentary view of the reverser structure of FIGURE 1 in the operative position.

Referring now to FIGURE 4, the reverser structure is shown in an intermediate position between the stowed position of FIGURE 3 and the operative reversing position of FIGURE 5. In the position shown in FIGURE 4 the leading edge 46 of each of the support plates 34 extends into the airflow from fan discharge chamber 26 to act as a spoiler and thus provide a selectable and variable drag for use when desired.

Figure 2:
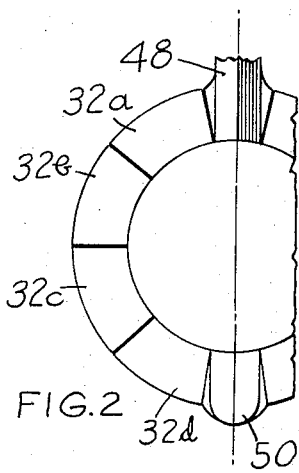
FIGURE 2 is a showing of a modified reverser structure, the view being a partial view looking upstream at a section taken through the reverser structure.

Referring now to FIGURE 2, an alternative arrangement for structure of the present invention is shown. FIGURE 2 is a view through the engine looking upstream at the reverser structure and showing the flexible fabric baffle of the present invention divided into a number of individual segments 32a, 32b, 32c, 32d and so forth around the periphery of the engine. This modified structure shown in FIGURE 2 allows for the integration of the fan reverser structure with such other elements as an engine pylon 48 and an accessories box 50. Also, the individual reverser segments can be individually actuated for targeting of reverser flow. That is, when appropriate or necessary, selective ones of the individual segments can be actuated so as to insure that reverser flow will not be undesirably directed, such as toward air frame structure where it might provide undesirable loadings or toward the ground where it might raise undesirable amounts of dirt under certain conditions. The individual reverser segments can also be selectively actuated to provide a variable air brake if desired.

While a preferred embodiment of the present invention has been shown and described, various modifications and substitutions may be made without departing from the spirit and scope of this invention. Accordingly, it is to be understood that this invention has been described by way of illustration rather than limitation.

What is claimed is:

1. A thrust reverser for a gas turbine engine, said engine having a main engine housing and a fan section, said fan section having a substantially annular discharge passage for discharging gas around said main engine housing, said thrust reverser comprising:

a flexible baffle mounted on said main engine housing downstream of said annular discharge passage;

a storage section in said main engine housing for storing said baffle, said baffle being normally in a stored position in said storage section;

a plurality of support elements disposed around said main engine housing, each of said support elements being connected to said flexible baffle and being pivotably connected to said main engine housing; and means for causing said support elements to pivot about their points of connection to the main engine housing, pivoting of said support elements outwardly from the housing extending said baffle from said stored position to an operative position, said baffle in said operative position defining an annular baffle disposed in the path of gas exiting from said annular discharge passage to change the direction of flow of said gas.

2. A thrust reverser as in claim 1 wherein said flexible baffle comprises a fabric material.

3. A thrust reverser as in claim 1 wherein said flexible baffle comprises a plurality of baffle segments.

4. A thrust reverser as in claim 1 wherein said storage section includes a recess in said main engine housing, and wherein said support elements comprise plates, said plates covering said storage section recess when said baffle is in said stored position.

5. A thrust reverser as in claim 4 wherein said baffle in said stored position is folded on itself.

6. A thrust reverser as in claim 4 wherein said plates form airflow spoilers in a position between the store position of said baffle and the reversing position.

7. A thrust reverser as in claim 1 wherein said flexible baffle assumes a stable position in said reversing position

References Cited

UNITED STATES PATENTS

| | | | |
|---|---|---|---|
| 2,936,582 | 5/1960 | Davidson | 244—113 |
| 3,280,561 | 10/1966 | Kutney | 60—22 |
| 3,302,404 | 2/1967 | Gist | 60—23 |

FOREIGN PATENTS 375,602  5/1923  Germany.

CARLTON R. CROYLE, *Primary Examiner.*